Patented Apr. 11, 1950

2,503,740

UNITED STATES PATENT OFFICE 2,503,740

PROJECTION DEVICE FOR PRESENTING AND REPRODUCING READING MATTER

Karel Jelinek, Blansko, Czechoslovakia

Application August 6, 1947, Serial No. 766,726
In Czechoslovakia May 12, 1947

3 Claims. (Cl. 88—24)

The invention relates to a device for presenting and reproducing reading matter, such as books and the like in a novel easily readable form.

The hitherto customary reading of books and the like reading matter involves a series of grave disadvantages.

(a) The individual lines end arbitrarily, for instance, sometimes in the middle of the words or in the middle of sentences expressing a coherent train of thoughts.

(b) The reader must retrovert his look after each line to the next; this not only causes a loss of time, but irritates the nerves.

(c) The individual lines of the reading matter must be fixed by the reader and lifted from the grey appearance of the other lines; this means a great strain on the eyes; it also acts unfavorably on the nerves and often leads to near-sightedness.

The height of the lines and of the letters or pictures included in the reading text is unalterable.

(d) Mistakes in the text cannot be corrected and the paper cannot be used for reprinting purposes.

It is the object of this invention to eliminate the aforesaid drawbacks.

Therefore, the reading matter, as for instance the text of a book, is in conformity with this invention applied to an endless film in such a manner that the lines of the reading matter extend on the film in spirally-shaped adjacent tracks and in nearby parallel relationship to the longitudinal edges of the film. The reading matter is continuously projected from the film onto a screen, a ground glass plate and the like in such a manner that the lines run in front of the reader from right to left in a spiral continuation with a speed and a size which may be selected at will, thereby creating what may be called "a moving book."

This moving book may be placed in a suitable box. The reader has during the reading procedure both hands free and may use them for any desired activity. The reading speed is hereby improved because the to-and-fro movement of the look is eliminated as only one line always passes in front of the reader.

The costs of the reading matter, for instance, of books and the like may be reduced to a tenth or even twentieth part of the hitherto customary costs required for the printing and binding of the books and the like.

Moreover, the distinctiveness of the reading matter is improved by the invention. The reading may be accompanied by music or speech through the aid of additional talking film strips; this may be of great help in the teaching and learning foreign languages.

Drawings and pictures may be used in addition to the reading matter for purposes of clarification, these pictures either appearing as stationary elements or being a part of the moving film itself.

Suitable coloring may be used for the projected reading matter, for instance, a dark-green color for the projected lines and a white color for the background, or white letters may be projected on a dark-green background; this will have a favorable influence on the eyes.

The daylight which is rather hard on the eyesight may be eliminated by providing the reading device with suitable shading attachments.

The advantages of my invention, therefore, result from the low costs of the film manufacture, from the quick reading of the film, from the savings in space and time, from the free movability of the hands of the reader, from low operating costs and from a reduction of the strain on the nervous system.

The invention will now be described in detail and with reference to the accompanying drawings illustrating a preferred embodiment thereof.

In the drawings,

Fig. 4 is a vertical sectional view on line B—B of Fig. 1.

Figure 1:
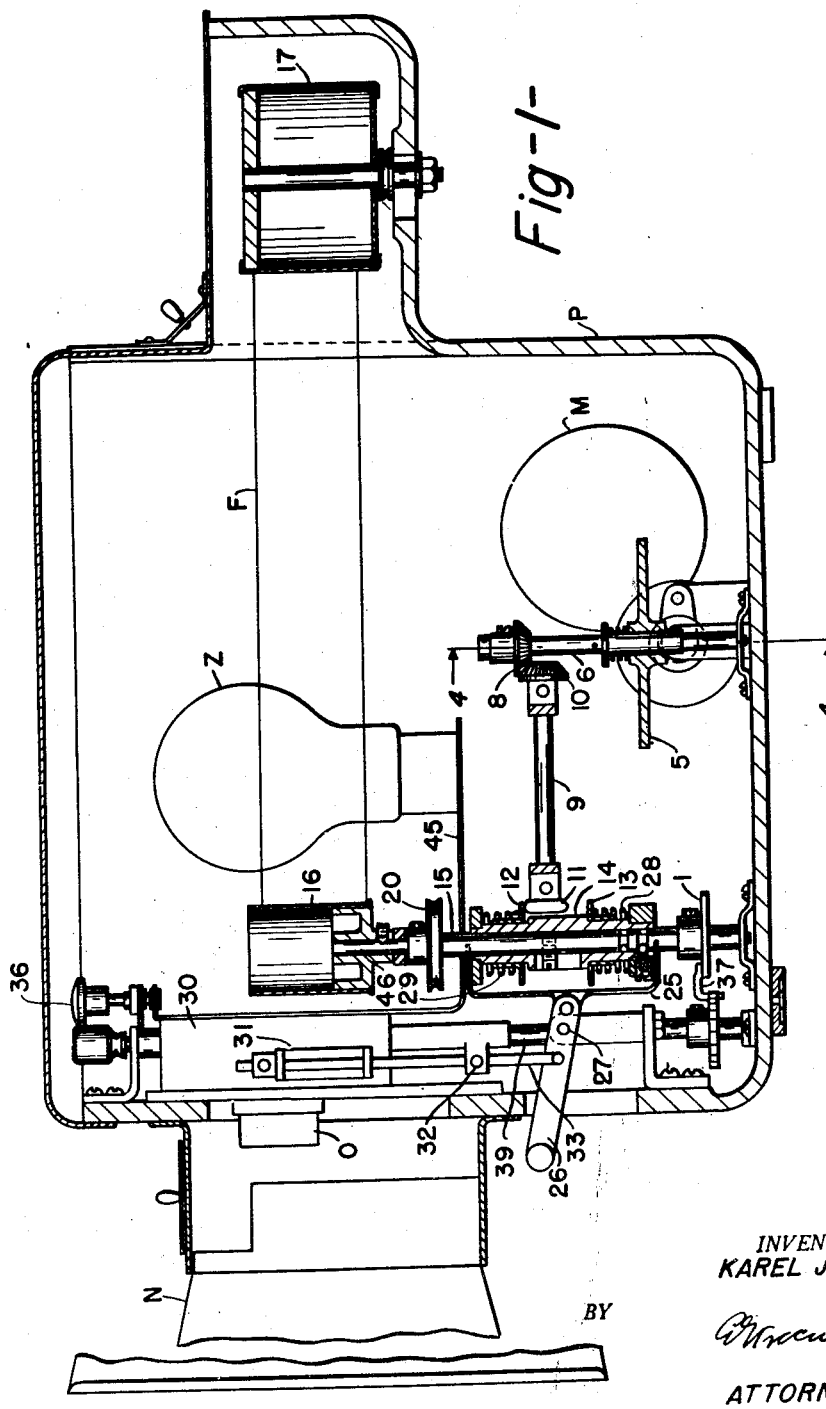
Fig. 1 is a vertical sectional view of my reading device on line 2—2 of Fig. 2.
Figure 2:
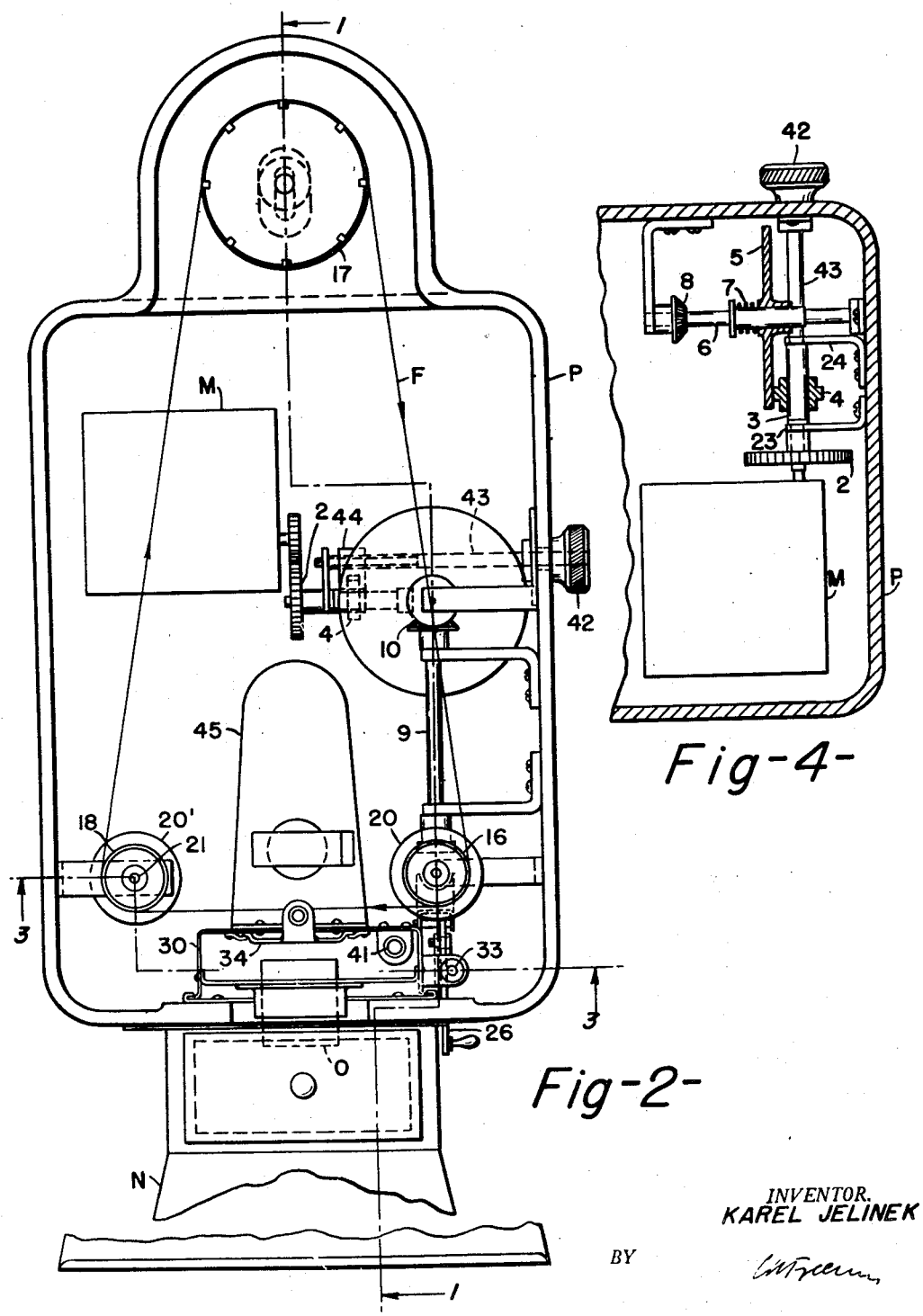
Fig. 2 is a plane view of the same.

The device forming the subject matter of my invention comprises essentially a casing P having an extension N which prevents direct access of the daylight to a screen, such as a ground glass plate, not shown in the drawing, located in extension N and adapted to make the reading matter visible, an electromotor M which moves the film, optical means O which enlarge the reading matter and a light source Z supplying the light for the film projection; the source of light may be a bulb which may be colored; its light intensity may also be reduced in another manner, for instance, by a light filter.

The lines or letters of the reading matter are so arranged on the film that they appear in spiral succession. The film may have ordinary size. Three rolls 16, 17, 18 are provided to transport and to guide the film.

The film is put in motion by an electromotor M which drives a toothed gear 2; this gear is mounted on shaft 3 which carries a friction roll 4, see Fig. 4; this roll is in frictional contact with disc 5 located on shaft 6; a spring 7 surrounding shaft 6 presses disc 5 against roll 4, whereby rotational movement is imparted to disc 5 from motor M; this rotation is then transmitted to the film conveying rolls 16, 17, 18.

A bevel gear 8 is mounted on the one end of shaft 6; this gear meshes with another bevel gear 10, see Fig. 1, which is mounted on shaft 9; a friction roll 11 is mounted on the one end of shaft 9 and this roll is located between two friction discs 12, 13; these friction discs are fastened to sleeve 14 which is vertically displaceable on shaft 15; shaft 5 carries the film transporting roll 16; the same shaft also supports disc 20 which drives disc 20¹ located on shaft 21 of the film transporting roll 18.

The speed of film F may be adjusted by the provision of a friction roll 4 located on shaft 3 which latter is supported in bearings 23, 24, see Fig. 4. The friction roll 4 may be displaced on shaft 3 by means of a button 42 in such a manner that it contacts the roll disc 5 at a larger or smaller radial distance. The displacement of roll 4 is effected by button 42 located on the one end of a threaded spindle 43 which carries screw 44; this screw displaces roll 4 and thereby changes the rotational speed of disc 5. The change of the rotational speed of disc 5 is then transmitted to the film transporting roll 16.

Rolls 16, 18 and thereby the film itself may be rotated in the direction of the film showing or opposite thereto or they may be stopped altogether. The possibility of reversing the direction of the film movement is important because it enables the reader to reread a passage. For severing the film travel sleeve 14 and friction discs 12, 13 attached thereto are provided; the sleeve is displaceable on shaft 15 by the up and down movement of casing 25, which is connected with the sleeve. This displacement is effected by a manually operated lever 25 attached to casing 25 and rotatable about shaft 27; by means of this lever roll 11 may be brought in contact with either one of the friction discs 12 or 13, the contact being intensified by springs 28, 29, or it may be stopped in an intermediary friction-free position. In this intermediary position roll 11 does not contact any of the discs 12, 13 and the film F will be accordingly stopped.

The interruption of the film movement takes automatically place after its final passing over the rolls 16, 18. This is effected in the following manner.

Diaphragm 13 is downwardly moved during the film projection. A pusher 31 is connected with the diaphragm, see Fig. 3. A stop 32, see Fig. 1, is located in the way of the downward movement of the diaphragm; stop 32 is fastened to rod 33 and this rod is connected with a lever 26. If diaphragm 30 is moved down and has reached the end of its travel, pusher 31 hits stop 32; the latter forces through the interaction of rod 33 and lever 26 casing 25 upwards; the friction discs 12, 13 are moved in an intermediary inoperative position and the movement of the film is interrupted.

Figure 3:
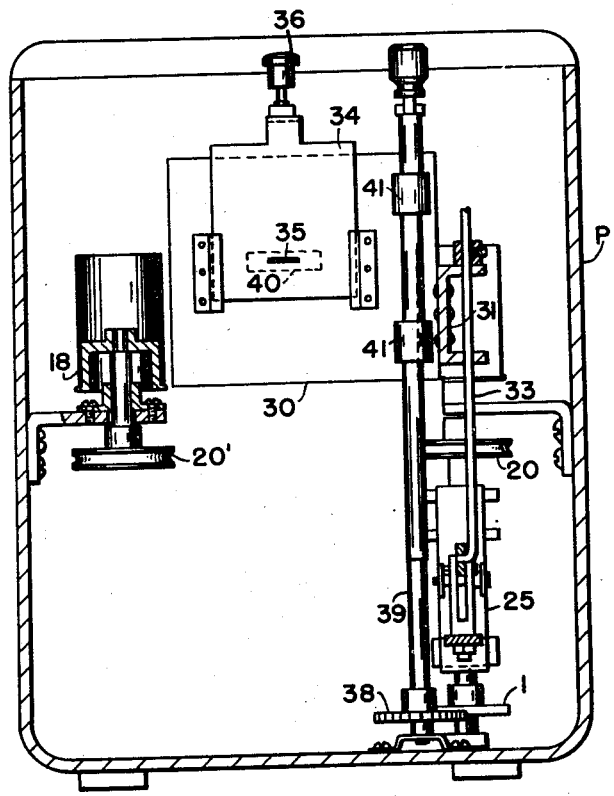
Fig. 3 is a vertical sectional view on line A—A of Fig. 2.

The diaphragm 30 which has the form of a casing is provided in its rear wall with a slot 40, see Fig. 3; a slide 34 provided with a narrow slit 35 is located in front of the rear wall of the diaphragm; it is displaceable by means of screw 36; this slit has a width which corresponds approximately to the height of the lines of the reading matter. Therefore there is never more than one line of the reading matter projected through slit 35 and therefore visible on a suitable screen, ground glass plate or the like. Slide 34 and slit 35 may be accurately adjusted with regard to the lines of the reading matter by screw 36.

The operation of diaphragm, see Figs. 1 and 3, is effected as follows.

A disc 1 is fastened on shaft 15 which carries film roll 16; a dog 37 is fastened to disc 1; if disc 1 and the dog 37 is rotated it entrains the toothed wheel 38 located on shaft 39. This shaft is provided with an outside thread meshing with screws 41 and these screws are connected with diaphragm 30; by rotation of the toothed wheel 38 and the resulting displacement of the screws 41 the diaphragm 30 and the slide 34 with its slit 35 may be moved in parallel relationship.

The base plate 45 which carries light source Z is fastened to the diaphragm 30 and therefore movable with the same whereby guarantee is obtained that the light rays are always properly centered.

What I claim is:

1. Device for presenting and reproducing reading matter comprising in a housing an endless film, reading matter applied to said endless film in the form of helical adjacent continuous lines extending in nearby parallel relationship to the longitudinal edges of said film, at least three film conveying rolls, means to adjust the speed of the film movement, a light source, a diaphragm, a slot in said diaphragm and optical means to enlarge said lines and to project the enlarged lines through said slot, said speed adjusting means including a shaft, a motor to drive said shaft, a friction roll on said shaft, a friction disc in operational contact with said friction roll, means to change the point of operational contact of said disc and said roll and therewith the rotational speed of said disc and means to transmit the change of speed to the film conveying rolls.

2. Device for presenting and reproducing reading matter comprising in a housing an endless film, reading matter applied to said endless film in the form of helical adjacent continuous lines extending in near-by parallel relationship to the longitudinal edges of said film, at least three film conveying rolls, means to adjust the speed of the film movement, a light source, a vertically displaceable diaphragm, a slot in said diaphragm and optical means enlarging said lines and to make the same visible, means to vertically displace the diaphragm and means to control the said displacement in dependence upon the change of speed imparted to the film, said means including a film conveying roll, a driven first shaft carrying said roll, a second outwardly threaded shaft, screws on said second shaft connected with said diaphragm and means to rotate said second shaft from said first shaft.

3. Device for presenting and reproducing reading matter comprising in a housing an endless film, reading matter applied to said endless film in the form of helical adjacent continuous lines extending in near-by parallel relationship to the longitudinal edges of said film, at least three film conveying rolls, means to adjust the speed of the film movement, a light source, a vertically displaceable diaphragm, a slot in said diaphragm and optical means enlarging said lines and to make the same visible, means to automatically stop the movement of the film upon its final passage through the film conveying rolls said means including a motor driven shaft, a friction roll located on said shaft, two vertically movable friction discs on both sides of said roll, a pusher attached to said downwardly displaceable diaphragm, a stop located in the path of said pusher and a lever operated by said stop to move said friction discs in an inoperative friction-free position.

KAREL JELINEK.

REFERENCES CITED

The following references are of record in the file of this patent:

UNITED STATES PATENTS

| Number | Name | Date |
|---|---|---|
| 528,140 | Buckmore | Oct. 30, 1894 |
| 966,342 | Madaler | Aug. 2, 1910 |
| 1,076,404 | Bolam et al | Oct. 21, 1913 |
| 1,166,384 | Partridge | Dec. 28, 1915 |
| 1,190,370 | Billings | July 11, 1916 |
| 1,206,984 | Bloom | Dec. 5, 1916 |
| 1,256,931 | Schlicker | Feb. 19, 1918 |
| 1,580,286 | Cloud | Apr. 13, 1926 |
| 1,624,667 | Kern | Apr. 12, 1927 |
| 1,641,727 | Bradford | Sept. 6, 1927 |
| 1,776,123 | Kroesen | Sept. 16, 1930 |
| 1,987,710 | Robbins | Jan. 15, 1935 |
| 2,357,593 | Leavell | Sept. 5, 1944 |
| 2,379,534 | Lowden | July 3, 1945 |